(12) United States Patent
Bendre et al.

(10) Patent No.: US 8,737,098 B2
(45) Date of Patent: *May 27, 2014

(54) CASCADED FLYING CAPACITOR MODULAR HIGH VOLTAGE INVERTERS

(75) Inventors: Ashish R. Bendre, Shorewood, WI (US); Slobadan Krstic, Brookfield, WI (US)

(73) Assignee: DRS Power & Control Technologies, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/399,703

(22) Filed: Feb. 17, 2012

(65) Prior Publication Data

US 2013/0051094 A1    Feb. 28, 2013

Related U.S. Application Data

(63) Continuation of application No. 12/347,185, filed on Dec. 31, 2008, now Pat. No. 8,144,491.

(51) Int. Cl.
H02M 7/48 (2007.01)

(52) U.S. Cl.
USPC .......................................................... 363/71

(58) Field of Classification Search
USPC .................. 363/17, 37, 39, 60, 71, 132, 137; 323/207, 268; 327/536
See application file for complete search history.

(56) References Cited

U.S. PATENT DOCUMENTS

| | | | |
|---|---|---|---|
| 5,642,275 A | 6/1997 | Peng et al. | |
| 6,005,788 A | 12/1999 | Lipo et al. | |
| 6,072,707 A * | 6/2000 | Hochgraf | 363/71 |
| 6,144,567 A | 11/2000 | Asplund et al. | |
| 6,236,580 B1 | 5/2001 | Aiello et al. | |
| 6,480,403 B1 | 11/2002 | Bijlenga | |
| 6,621,719 B2 | 9/2003 | Steimer et al. | |
| 6,697,271 B2 | 2/2004 | Corzine | |
| 6,954,366 B2 | 10/2005 | Lai et al. | |
| 6,969,967 B2 * | 11/2005 | Su | 318/801 |
| 7,830,681 B2 | 11/2010 | Abolhassani et al. | |
| 8,144,491 B2 | 3/2012 | Bendre et al. | |
| 2005/0065901 A1 | 3/2005 | Diong | |
| 2005/0127853 A1 | 6/2005 | Su | |

OTHER PUBLICATIONS

Non-Final Office Action for U.S. Appl. No. 12/347,185 mailed on May 24, 2011, 11 pages.

Notice of Allowance for U.S. Appl. No. 12/347,185 mailed on Nov. 16, 2011, 7 pages.

* cited by examiner

*Primary Examiner* — Adolf Berhane
*Assistant Examiner* — Yemane Mehari
(74) *Attorney, Agent, or Firm* — Kilpatrick Townsend & Stockton LLP

(57) ABSTRACT

A high voltage inverter is provided which includes a plurality of k-level flying capacitor H bridge modules, k being greater than 2, each having a positive dc terminal, a negative dc terminal, and two ac terminals, a connecting unit for connecting said ac terminals of said plurality of k-level flying capacitor H bridge modules in series to form a cascading set of modules, and a dc source connected to an ac source and having a transformer, a rectifier rectifying an output voltage of said transformer, and a capacitor connected between the positive and negative dc terminals.

11 Claims, 10 Drawing Sheets

CASCADED FLYING CAPACITOR MODULAR HIGH VOLTAGE INVERTERS

CROSS-REFERENCES TO RELATED APPLICATIONS

The present application is a continuation of U.S. patent application Ser. No. 12/347,185, filed on Dec. 31, 2008, now U.S. Pat. No. 8,144,491. The disclosure of which is hereby incorporated by reference in its entirety.

FIELD OF THE INVENTION

The present invention generally relates to power inverters and more particularly to a cascaded flying capacitor modular high voltage inverter.

BACKGROUND OF THE INVENTION

Conventional medium voltage power inverter designs typically produce compromised results. For example, medium voltage drives and power supplies have been synthesized using high voltage devices, but these typically have high switching losses which adversely affects the output waveform harmonic content.

A conventional variable frequency medium voltage drive typically is employed to drive a medium voltage motor for the control of 5 MW to 75 MW loads or processes. The conventional medium voltage drive usually operates at medium voltages of 4.16 kV to 13.2 kV as operation at voltages substantially lower than 4.16 kV leads to excessive currents and power losses. While a conventional medium voltage drive can be manufactured using a standard high voltage power semiconductor, the selection and availability of standard high voltage power semiconductors are limited. In addition, conventional high voltage power semiconductors typically are severely lacking in switching speed, thus limiting the switching frequency. In addition, conventional medium voltage drives typically require specialized multi-level circuitry that tends to increase the dollar cost per kva of the drive.

Conventional low voltage drives of 400V-690V typically cost significantly less per kva than medium voltage drives due to higher production volume, technology maturity and market pressures. However, these conventional low voltage drives are not by themselves suited for controlling 5 MW to 75 MW loads or processes. Low voltage devices have been used in a series configuration, however, voltage sharing and balance during switching events is typically difficult and waveform harmonic content remain high. Conventional diode clamped and flying capacitor three-level converters allow a doubling of the dc bus and output voltage for a given switching device, but this voltage level is still limited by the device ratings. While the output harmonics are still excessive. Cascaded H bridge two-level converters, each fed by isolated direct current (DC) sources, have proven to be a suitable choice when a wide range of output voltage with high harmonic fidelity is desired. However, the number of cells required to synthesize medium voltages is excessive, and this directly correlates to an increase in the number of secondary transformer windings required to generate the dc source.

There is a need for a medium voltage inverter topology that is not reliant on series devices. Further, there is a need to increase the voltage and switching frequency capability of existing diode clamped and flying capacitor solutions. There is also a need to limit the number of cascaded cells in a cascaded two-level H bridge converter without impacting the voltage and switching frequency capability.

Thus, there exists a need for hybrid topology that increases the output voltage capability of each cascaded cell, thereby limiting the total number of cells, the associated rectifiers and transformer windings required to produce the isolated dc voltages.

BRIEF SUMMARY OF THE INVENTION

Methods and systems consistent with the present invention provide a medium voltage inverter having a variable voltage, variable frequency, and medium voltage output. The inverter may be, for example, a drive or power supply. The inverter beneficially includes a reduced number of cascaded stages required to synthesize a given output voltage level, without increasing the total harmonic distortion in the output waveforms. The inverter includes a plurality of multiple level flying capacitor inverter modules connected in series at their alternating current (AC) terminals to produce a desired AC output. Each k-level flying capacitor module can generate waveforms with the same harmonic fidelity as k-1 series two level H-bridges. The flying capacitor converter enables expansion above three levels at the cell level unlike conventional diode clamped converters. The availability of multiple voltages at the cell level, in combination with the cascaded structure provides increased flexibility in designing the system, while reducing the total number of cells. Each cell can accept a higher input DC voltage compared to conventional two-level inverters, yet may use the same switches as conventional two-level inverters. If this input voltage is generated from a transformer winding through a rectifier, the number of stages may be correspondingly reduced.

In an illustrative example, three k-level cascaded flying capacitor poles may be connected to form a three-phase active rectifier which connects to the transformer secondary winding. In another illustrative example, two two-level active rectifiers can be connected in series to achieve DC bus regulation. If either of these active rectifier arrangements are used, bidirectional power flow can be attained and the regenerative operation is achieved.

Other apparatus, features and advantages of the present invention will be or will become apparent to one having skill in the art upon examination of the following figures and detailed description. It is intended that all such additional apparatus, features and advantages be included within this description, be within the scope of the present invention, and be protected by the accompanying drawings.

DETAILED DESCRIPTION OF THE INVENTION

Reference will now be made in detail to an implementation in accordance with methods, systems, and articles of manufacture consistent with the present invention as illustrated in the accompanying drawings. The same reference numbers may be used throughout the drawings and the following description to refer to the same or like parts.

Figure 1:
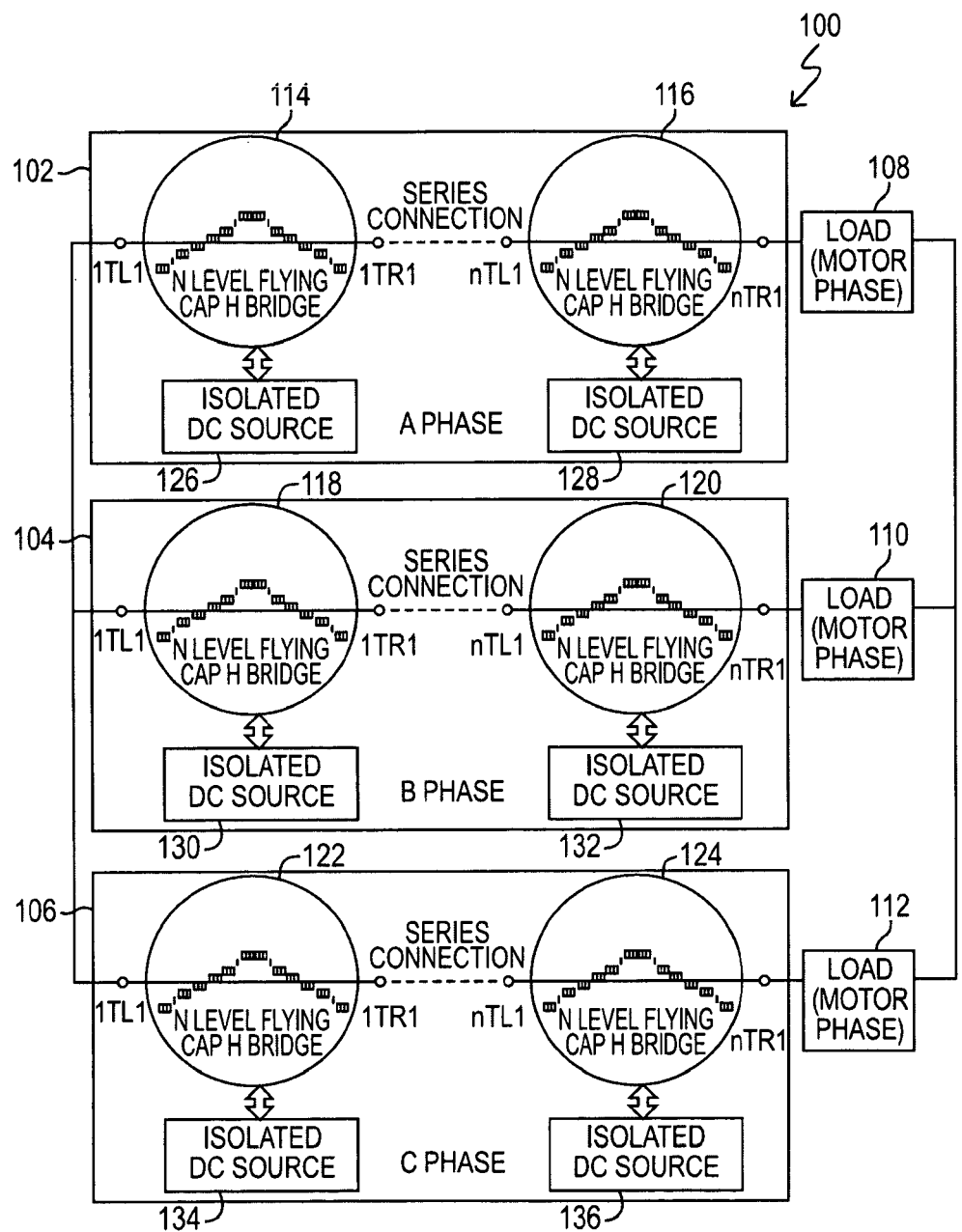
FIG. 1 is a schematic diagram of a cascaded flying capacitor modular high voltage inverter consistent with the present invention.

FIG. 1 shows an illustrative cascaded flying capacitor multi-level inverter 100 consistent with the present invention. The illustrative inverter is a three-phase wye connected inverter, where each phase 102, 104, 106 consists of a plurality of multiple voltage level flying capacitor H bridge inverter modules ("FCHBIM" or "module") connected in series. In the illustrative example, phase A 102 includes modules 114 and 116, phase B includes modules 118 and 120, and phase C includes modules 122 and 124.

A load 108, 110, 112 is connected at to each respective phase 102, 104, 106. The illustrative loads 108, 110, 112 are each shown as wye connected, however one having skill in the art would appreciate that a load may be delta connected. Each FCHBIM receives input voltage from a respective isolated DC source 126, 128, 130, 132, 134, 136 as shown. The total phase voltage applied to the load 108, 110, 112 is the sum of the voltages generated by each individual FCHBIM. As the flying capacitor multilevel topology allows each FCHBIM to generate theoretically unlimited AC output voltages, the number of FCHBIMs and isolated DC sources required may be reduced by increasing the number of levels within each FCHBIM.

Figure 2:
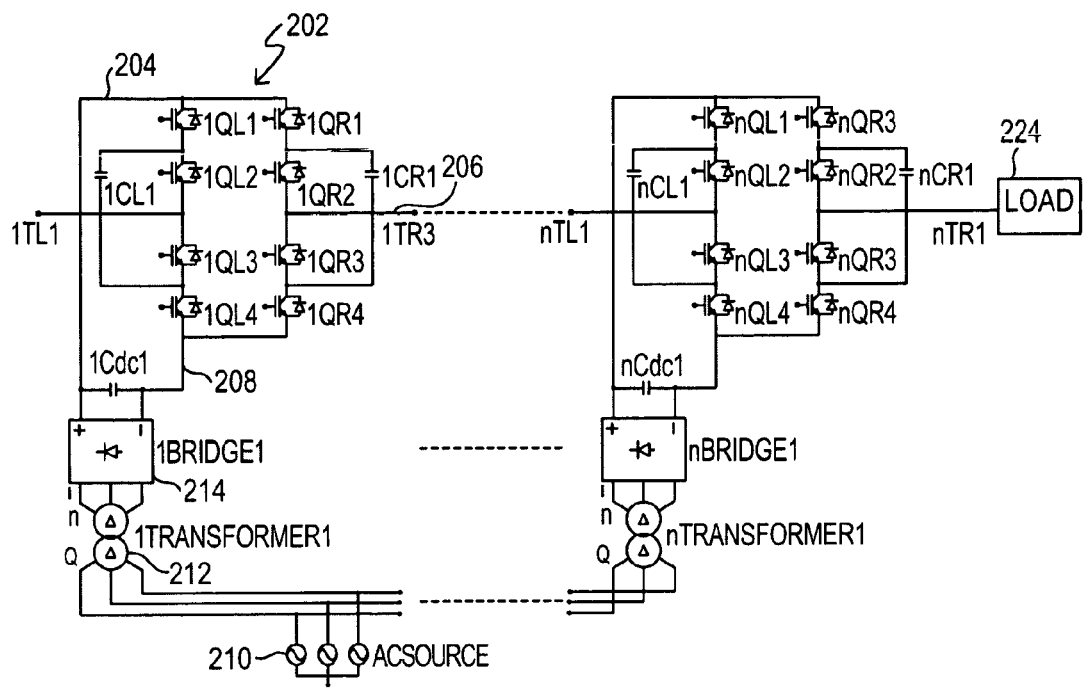
FIG. 2 is a schematic diagram of three-level flying capacitor H bridge modules which may be cascaded to produce the inverter of FIG. 1.

FIG. 2 shows a set of three-level FCHBIMs connected in series so a high output voltage can be developed at the load 224. The module 202 is illustrative of each FCHBIM and includes eight switching devices 1QL1, 1QL2, 1QL3, 1QL4, 1QR1, 1QR2, 1QR3, and 1QR4, each of which may be for example an insulated gate bipolar transistor (IGBT), insulated gate commutated thyristor (IGCT), gate turn off thyristor (GTO) devices with antiparallel diodes, and the like. The eight switching devices are split into a left pole (including 1QL1, 1QL2, 1QL3, and 1QL4) and a right pole (including 1QR1, 1QR2, 1QR3, and 1QR4), each pole containing four switching devices Each pole further contains a capacitor 1CL1, 1CR1 referred to herein as the flying capacitor.

For each pole, a first pair of switches is connected between a positive DC bus 204 and the AC output 206 (1QR1 and 1QR2 for the right pole). A second pair of switches is connected between the AC output 206 and a negative DC bus 208 (1QR3 and 1QR4 for the right pole). A first electrical connection of the flying capacitor 1CR1 is made in between the switches in the first pair (between 1QR1 and 1QR2 for right pole), and a second electrical connection is made between the switches of the second pair (between 1QR3 and 1QR4 for right pole). An energy storage capacitor 1Cdc1 is connected between the positive terminal 204 and negative terminal 208 of the DC bus. A common AC source 210 feeds separate transformers 212 whose secondaries are rectified through three-phase diode bridge rectifiers and source the DC bus capacitors 214.

Figure 3:
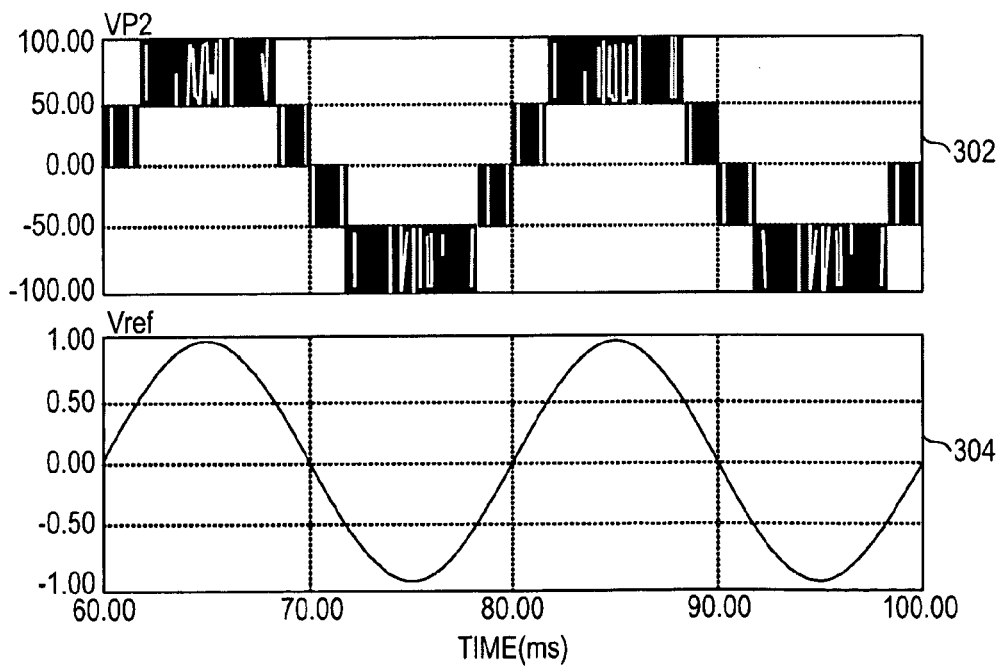
FIG. 3 depicts a waveform generated by a three-level flying capacitor H bridge module.

FIG. 3 shows illustrative waveforms 302 generated by each FCHBIM of FIG. 2 at its AC terminals for a sinusoidal reference voltage 204.

Figure 4:
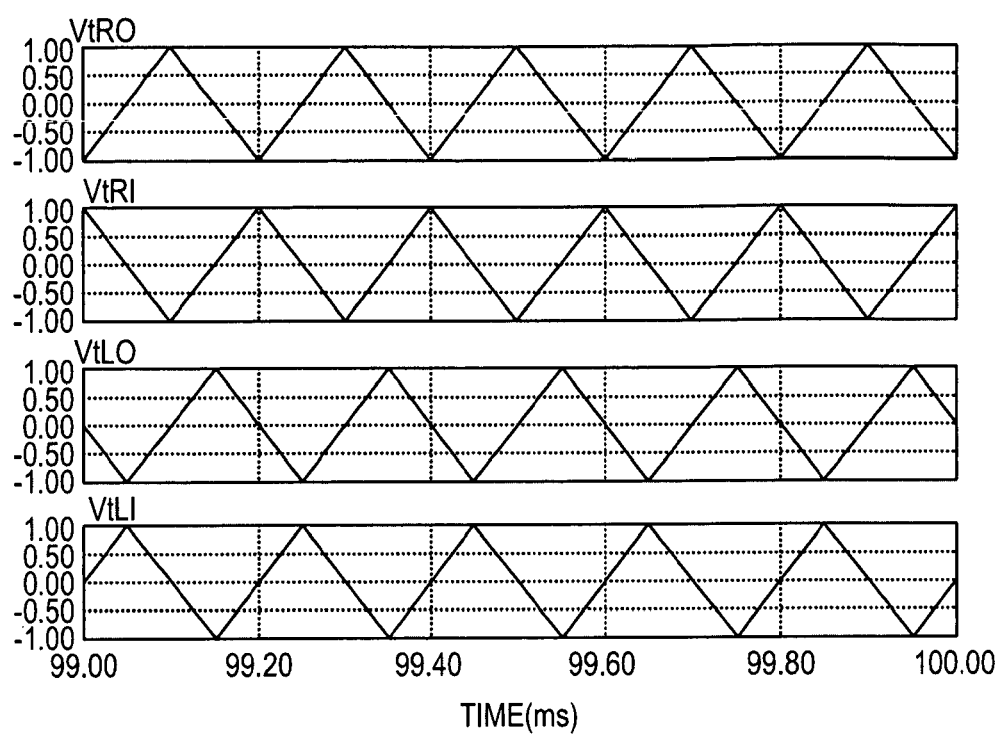
FIG. 4 depicts carrier waveforms for pulse width modulation for a three-level flying capacitor H bridge module.

FIG. 4 shows illustrative carrier waveforms for generating the gate signals for each of the switching devices of FIG. 2. The illustrative carrier waveforms are generated with pulse width modulation with shifting of the respective carrier waveform. In the illustrative example, within each pole:

Device 1QR1 and 1QR4 are oppositely phased, i.e. when 1QR1 is on 1QR4 is off and vice versa. Both devices are held off for a small time interval to prevent cross conduction. The time interval may be, for example, 1 to 30 µs.

Device 1QR2 and 1QR3 are oppositely phased, i.e. when 1QR2 is on 1QR3 is off and vice versa. Both devices are held off for a small interval of time to prevent cross conduction. The time interval may be, for example, 1 to 30 µs.

The gate signals for 1QR1 and 1QR4 are generated by comparing the reference sinusoid Vref304, to a triangular carrier waveform VtRO. The gate signals for 1QR2 and 1QR3 are generated by comparing the reference sinusoid Vref304, to a triangular carrier waveform VrRI which is phase shifted from VtRO by 180 degrees.

The gate signals for 1QL1 and 1QL4 are generated by comparing the negative of the reference sinusoid Vref304, to a triangular carrier waveform VtLO. The gate signals for 1QL2 and 1QL3 are generated by comparing the negative of the reference sinusoid Vref304, to a triangular carrier waveform VtLI which is phase shifted from VtLO by 180 degrees. Also, the triangular carrier VtLO is phase shifted from VtRO by 90 degrees.

Phase shifting of the triangular carriers as described above minimizes the harmonic content of the output AC waveform as well as maintains charge balance on the flying capacitors 1CL1, 1CR1.

Figure 5:
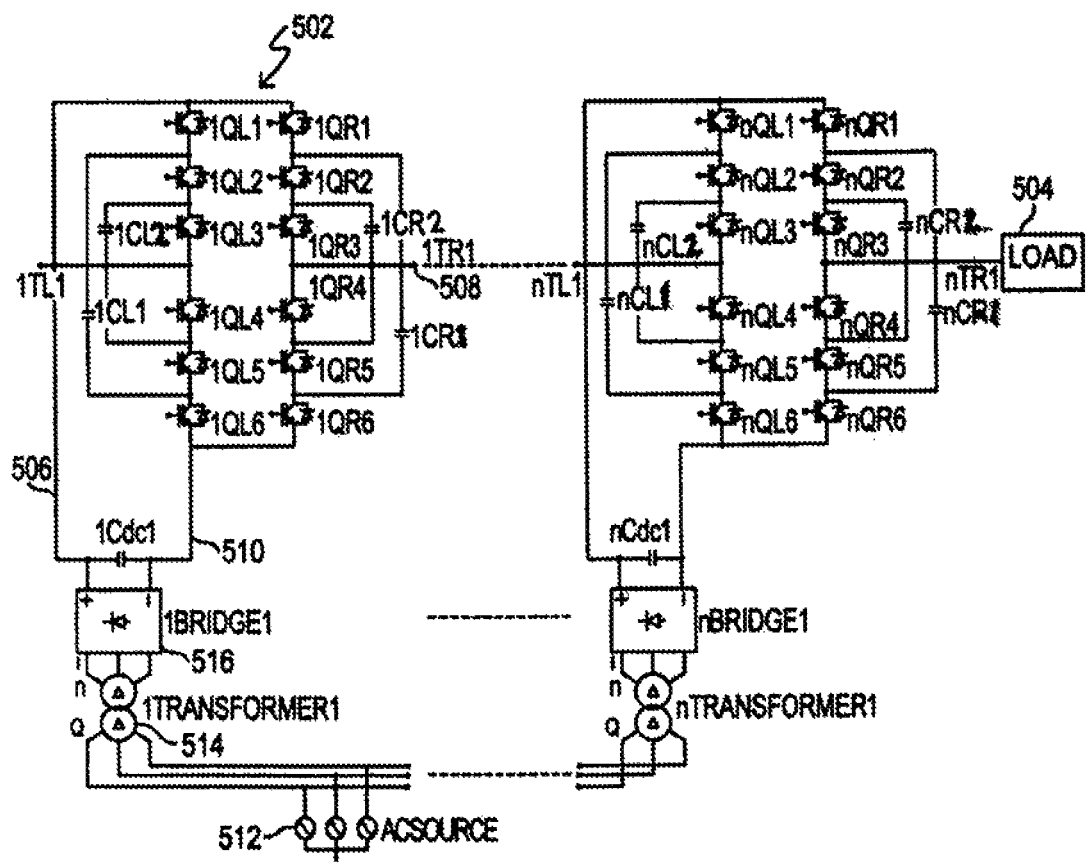
FIG. 5 is a schematic diagram of four-level flying capacitor H bridge modules which may be cascaded to produce the inverter of FIG. 1.

FIG. 5 depicts another embodiment consistent with the present invention in which a set of four-level FCHBIMs are connected in series so a high output voltage can be developed at a load 504. The module 502 includes twelve switching devices 1QL1, 1QL2, 1QL3, 1QL4, 1QL5, 1QL6, 1QR1, 1QR2, 1QR4, 1QR5, 1QR6 which can be, for example, an insulated gate bipolar transistor (IGBT), insulated gate commutated thyristor (IGCT), gate turn off thyristor (GTO) devices with antiparallel diodes, and the like. The eight switching devices are split into a left pole (1QL1, 1QL2, 1QL4, 1QL5, 1QL6) and a right pole (1QR1, 1QR2, 1QR3, 1QR4, 1QR5, and 1QR6), each pole containing six switching devices each. Each pole further contains two capacitors referred to as flying capacitors 1CL1, 1CL2, 1CR1, 1CR2. For each pole, the first set of three switches (e.g., 1QR1, 1QR2 and 1QR3 for the right pole) is connected in series between a positive DC bus 506 and an AC output 508. The second set of three switches is connected between the AC output and a negative bus 510 (e.g., 1QR4, 1QR5 and 1QR6 for the right pole). The first connection of the first flying capacitor (e.g., 1CR1) is made in between the first and the second switches in the first set of three switches (e.g., between 1QR1 and 1QR2 for the right pole) and the second connection is made between the second and the third switches of the second set of three switches (e.g., between 1QR5 and 1QR6 for the right pole). The first connection of the second flying capacitor (e.g., 1CR2) is made in between the second and the third switches in the first set of three switches (e.g., between 1QR2 and 1QR3 for the right pole), and the second connection is made between the first and second switches of the second set of three switches (e.g., between 1QR4 and 1QR5 for the right pole). An energy storage capacitor 1Cdc1 is connected between the positive and negative terminals of the DC bus. A common AC source 512 feeds separate transformers 514 whose secondaries are rectified through three-phase diode bridge rectifiers and source the dc bus capacitors 516.

Figure 6:
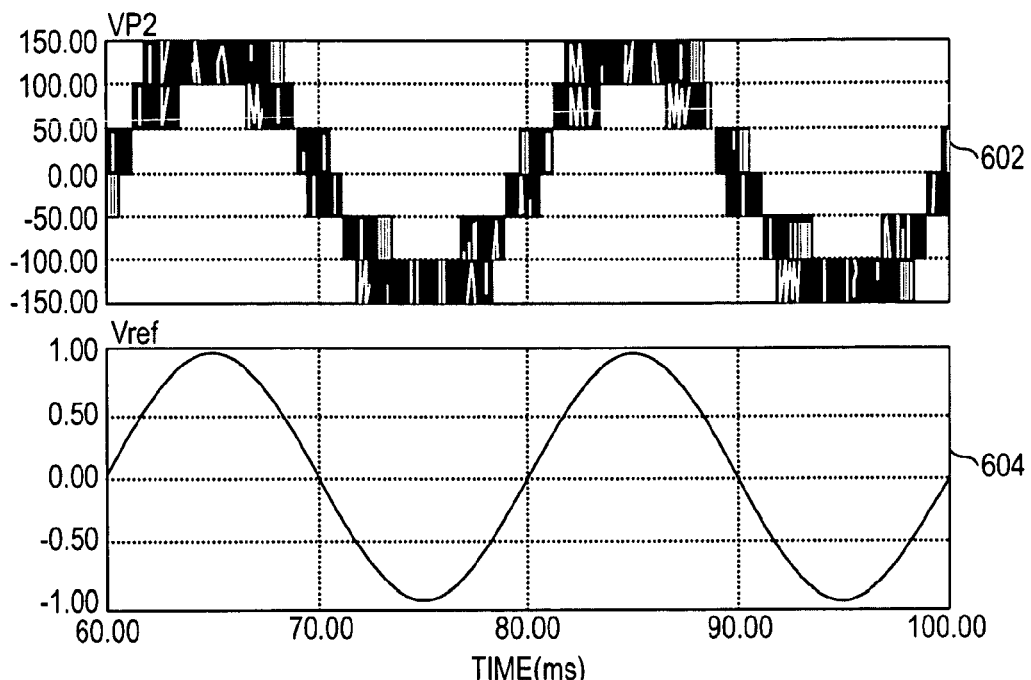
FIG. 6 depicts a waveform generated by a four-level flying capacitor H bridge module.

FIG. 6 shows illustrative waveforms 602 generated by each FCHBIM of FIG. 5 at its AC terminals for a sinusoidal reference voltage 604.

Figure 7:
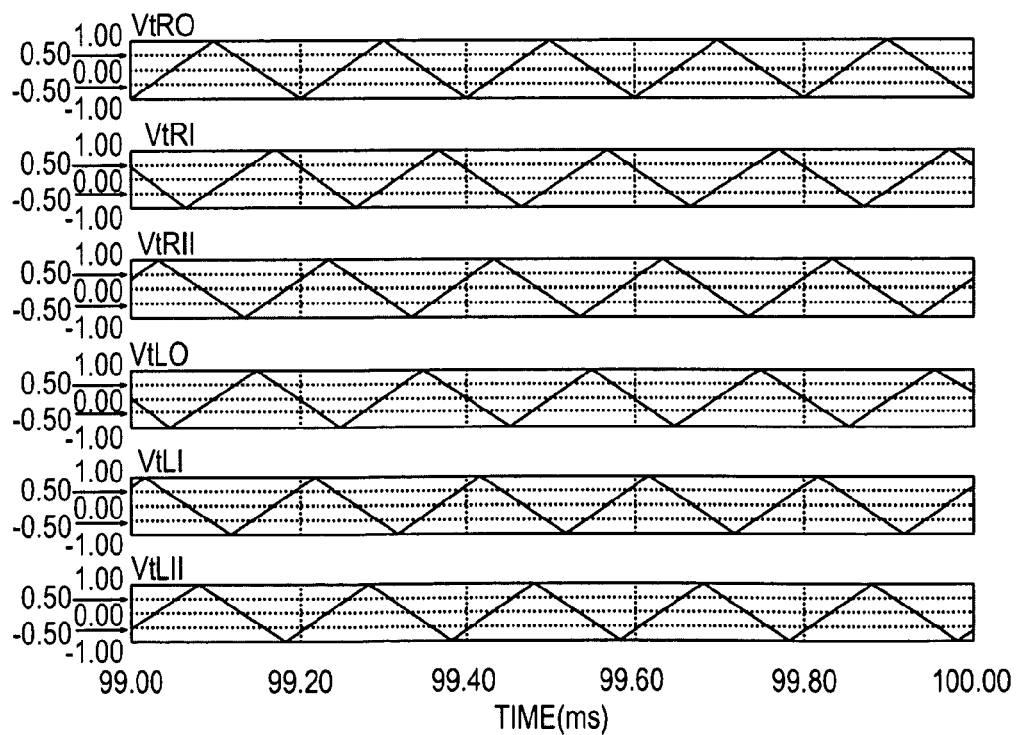
FIG. 7 depicts carrier waveforms for pulse width modulation for a four-level flying capacitor H bridge module.

FIG. 7 shows illustrative carrier waveforms for generating the gate signals for each of the switching devices of FIG. 5. The illustrative carrier waveforms are generated with pulse width modulation with shifting of the respective carrier waveform. In the illustrative example, within each pole:

Device 1QR1 and 1QR6 are oppositely phased, i.e. when 1QR1 is on 1QR6 is off and vice versa. Both devices are held off for a time interval to prevent cross conduction. The time interval may be, for example, 1-30 µs.

Device 1QR2 and 1QR5 are oppositely phased, i.e. when 1QR2 is on 1QR5 is off and vice versa. Both devices are held off for a time interval to prevent cross conduction. The time interval may be, for example 1-30 µs.

Device 1QR3 and 1QR4 are oppositely phased, i.e. when 1QR3 is on 1QR4 is off and vice versa. Both devices are held off for a time interval to prevent cross conduction. The time interval may be, for example, 1-30 µs.

The gate signals for 1QR1 and 1QR6 are generated by comparing the reference sinusoid Vref604 to a triangular carrier waveform VtRO. The gate signals for 1QR2 and 1QR5 are generated by comparing the reference sinusoid Vref604 to a triangular carrier waveform VtRII which is phase shifted from 1VtRO by 240 degrees.

The gate signals for 1QL1 and 1QL6 are generated by comparing the negative of the reference sinusoid Vref604 to a triangular carrier waveform VtLO. The gate signals for 1QL2 and 1QL5 are generated by comparing the negative of the reference sinusoid Vref604 to a triangular carrier waveform VtLI which is phase shifted from VtLL by 120 degrees. 1QL3 and 1QL4 are generated by comparing the negative of the reference sinusoid Vref604 to a triangular carrier waveform VtLII which is phase shifted from VtLO by 240 degrees. Also the triangular carrier VtLO is phase shifted from VtRO by 90 degrees.

Phase shifting of the triangular carriers as described above minimizes the harmonic content of the output AC waveform as well as maintains charge balance on the flying capacitors.

By adding two controlled switches and a flying capacitor to each pole of a FCHBIM, the AC voltage can be increased. The number of levels in the output AC waveform also increases, thus ensuring that the harmonic content remains low. Thus, this strategy can be extended to a k-level FCHBIM to meet the cell AC output voltage requirements while maintaining low harmonic distortion, which provides performance flexibility at the module level. In an illustrative example, harmonic performance is optimized by shifting the k−1 carriers generated for each pole from one another by 360/(k−1) degrees.

Figure 8:
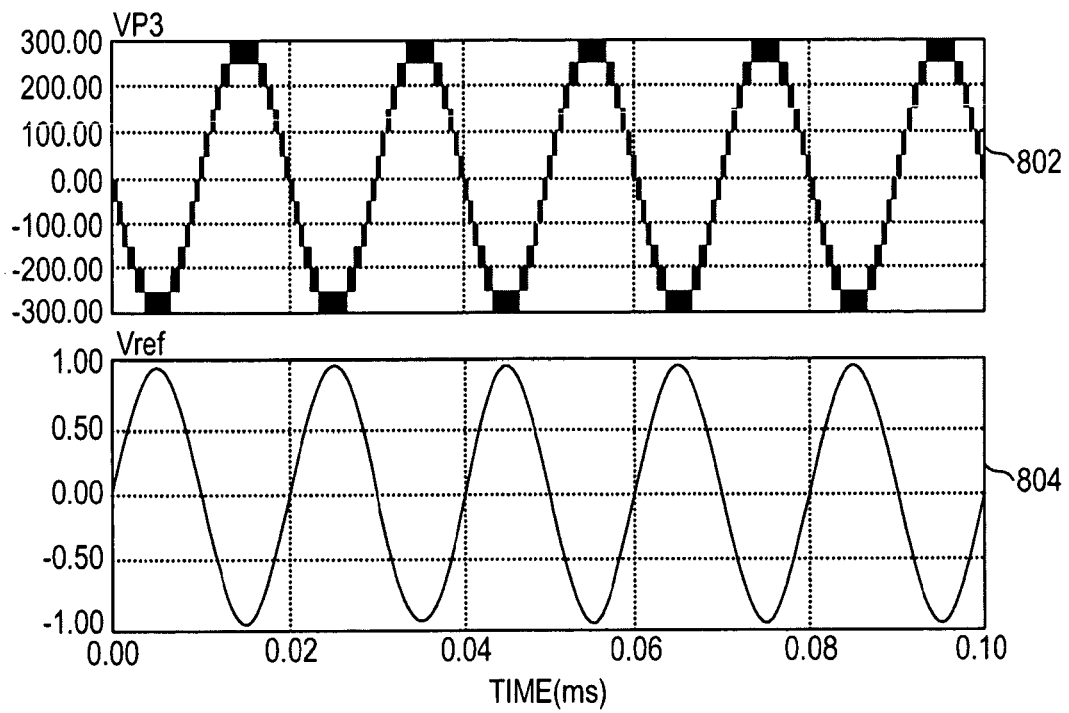
FIG. 8 depicts a waveform generated by three cascaded three-level flying capacitor H bridge modules to produce an inverter consistent with the present invention.
Figure 9:
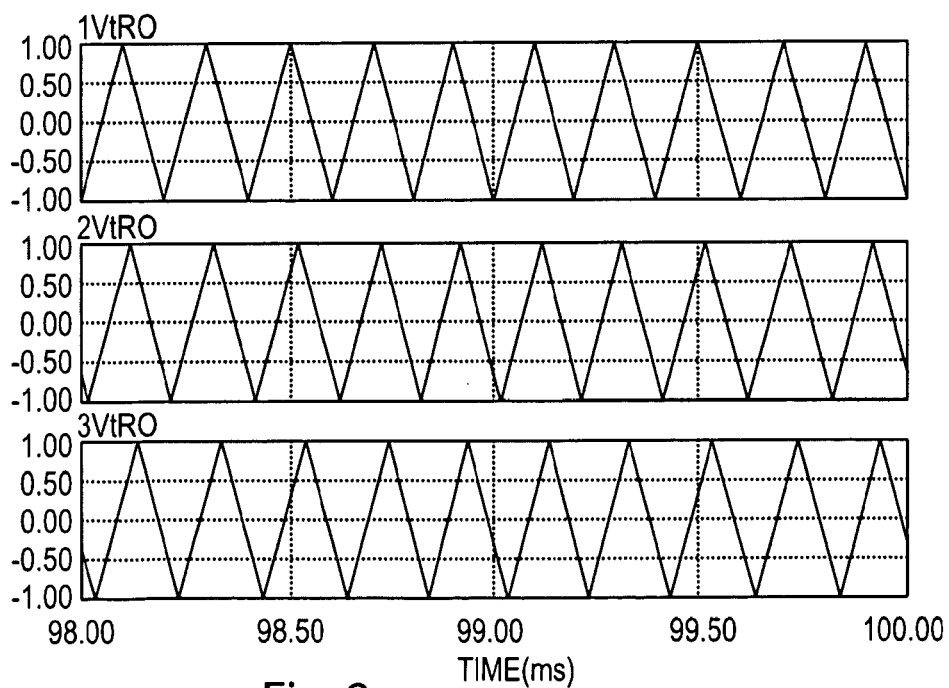
FIG. 9 depicts carrier waveforms for pulse width modulation for three cascaded three-level flying capacitor H bridge modules to produce an inverter consistent with the present invention.

The FCHBIM modules can be cascaded to further increase the voltage capability of the inverter. FIG. 8 shows illustrative AC output waveforms 802 generated by three cascaded three-level FCHBIM for a sinusoidal reference voltage 804. To maintain harmonic and dv/dt control, the carrier waveforms in each cascaded stack are phase shifted from one another by 90/n degrees, where n is the number of FCHBIMs used. Three illustrative carrier waveforms are shown in FIG. 9 for the three cascaded three-level FCHBIM implementation. Within each FCHBIM, the carrier waveforms obey the phase shifts as discussed above.

Figure 10:
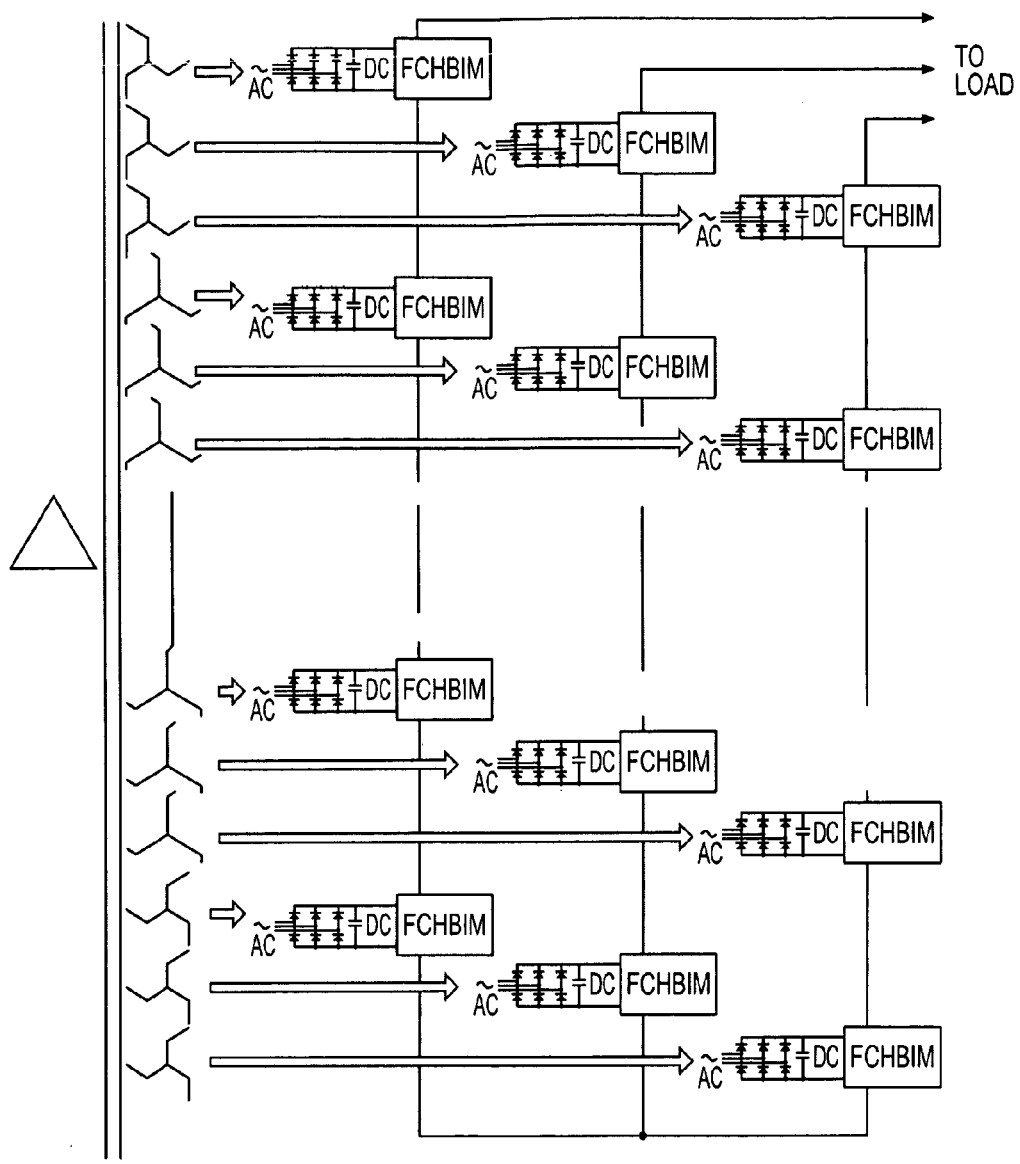
FIG. 10 is a schematic diagram of a cascaded flying capacitor modular high voltage inverter having zig zag transformer secondaries employed for the isolated DC sources.
Figure 11:
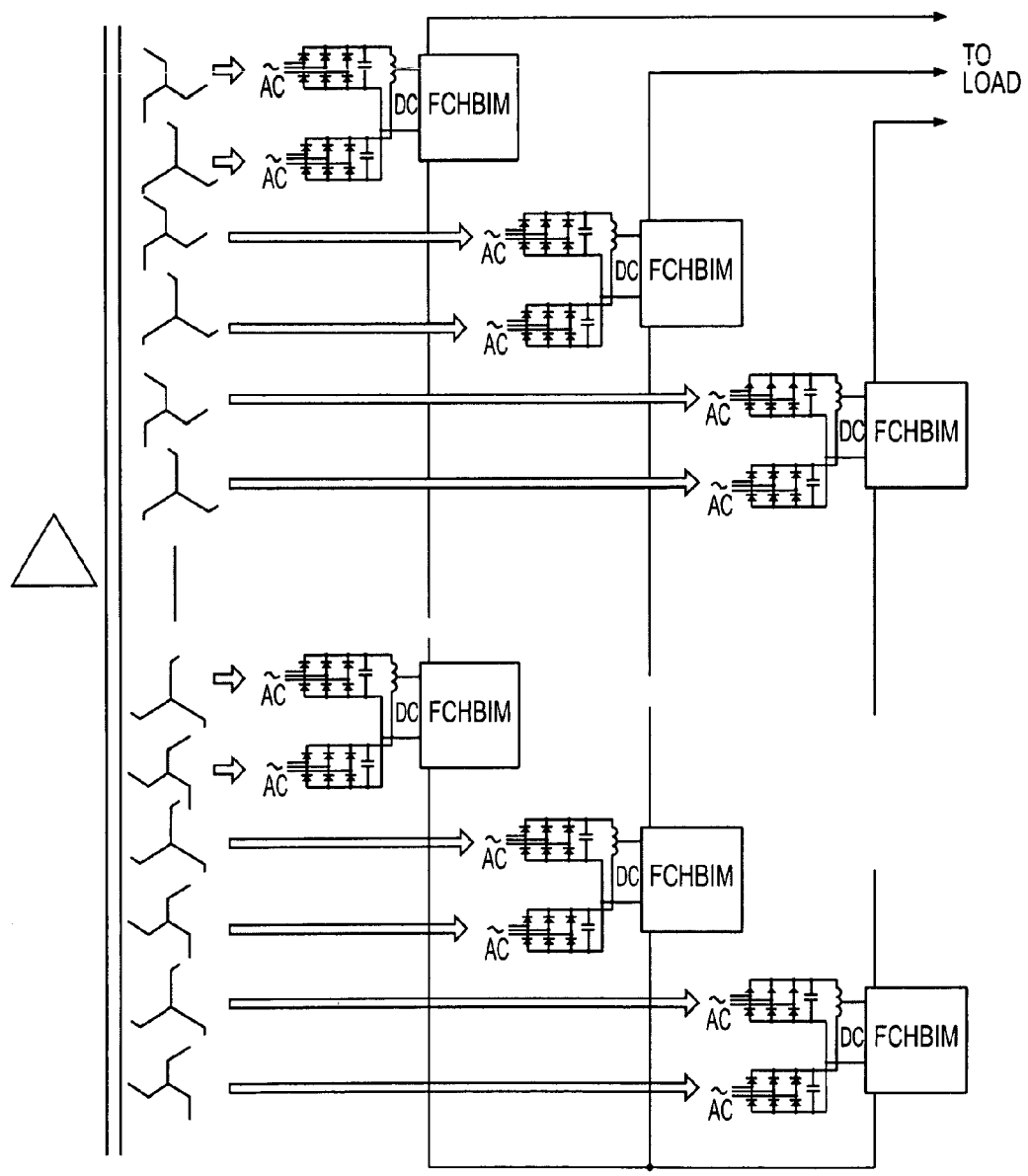
FIG. 11 is a schematic diagram of a cascaded flying capacitor modular high voltage inverter having zig zag transformer secondaries and 12 pulse rectifiers employed for the isolated DC sources.

To increase the harmonic performance on the input of the inverter system, zig zag transformer secondaries can be employed to create the isolated DC sources as shown in the illustrative example of FIG. 10. If higher level FCHBIMs are used, the higher DC voltage can be generated using multi pulse front ends as shown in FIG. 11.

Figure 12:
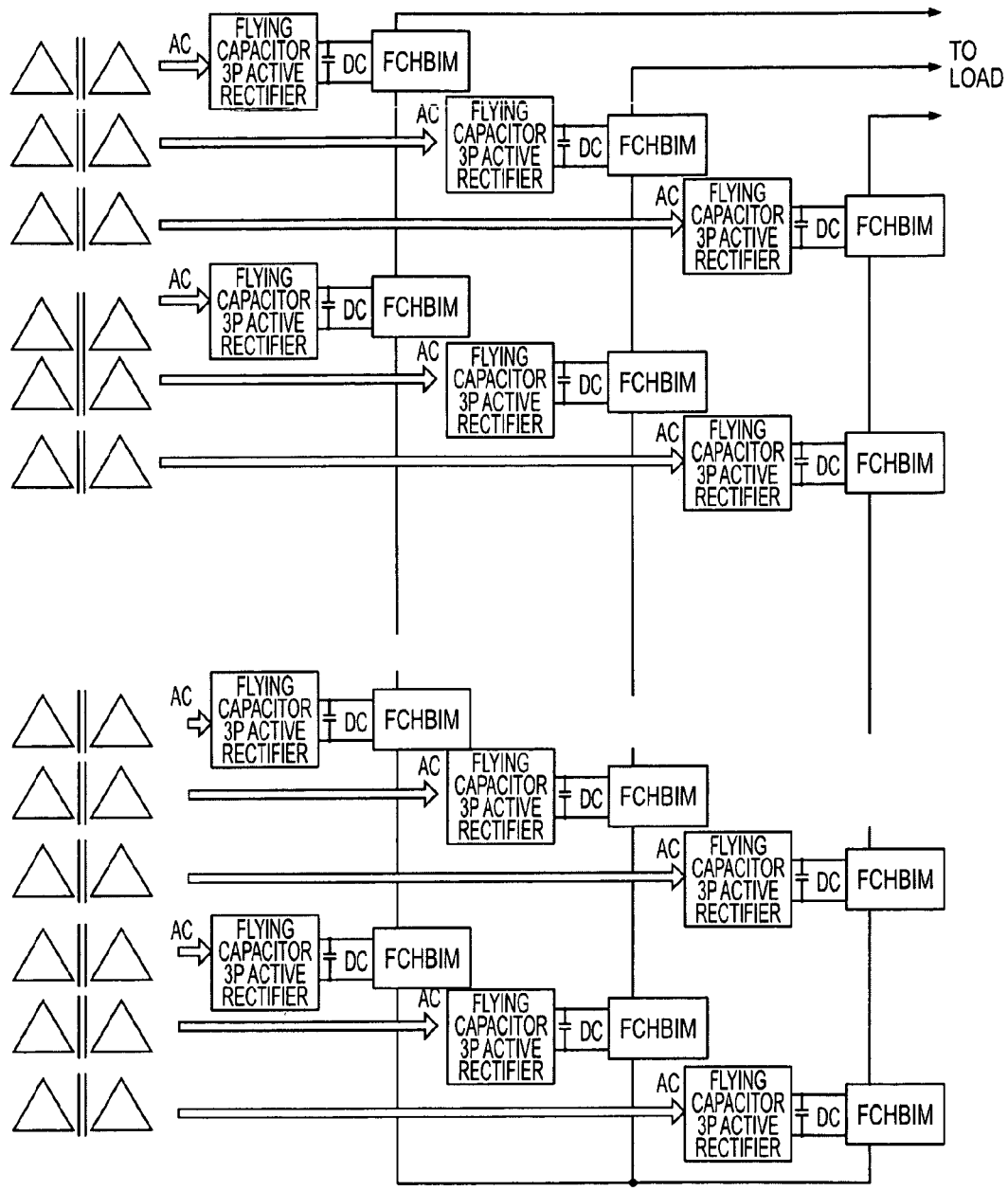
FIG. 12 is a schematic diagram of an k-level three-phase active rectifiers which may be used instead of passive rectifiers in accordance with the present invention.
Figure 13:
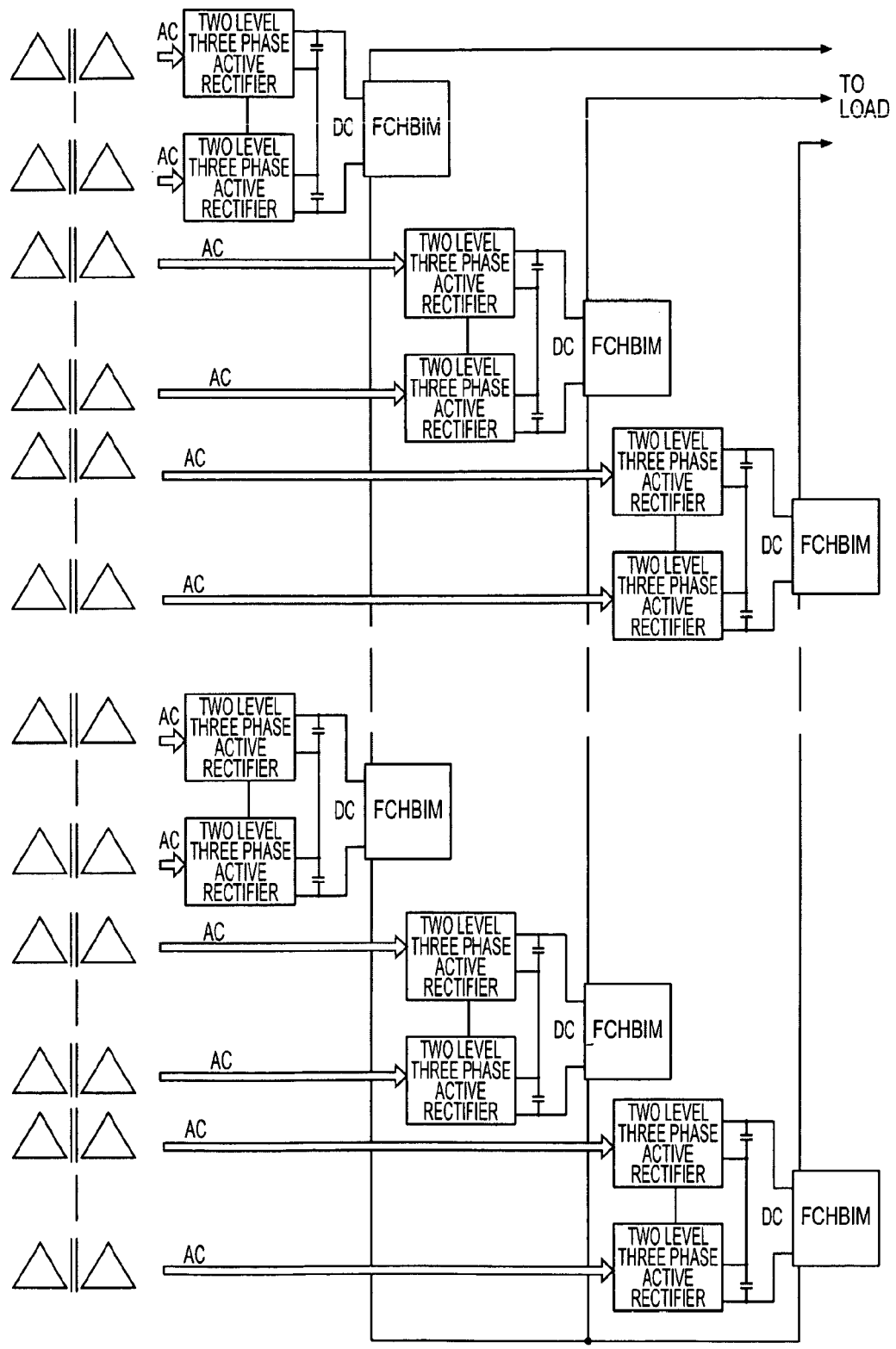
FIG. 13 is a schematic diagram of stacked two-level three-phase active rectifiers which may be used instead of passive rectifiers in accordance with the invention.

If regenerative operation is desired, the zig zag transformer of FIG. 10 and the diode rectifiers can be replaced by n-level three phase flying capacitor active rectifiers as shown in FIG. 12. Alternatively, this regenerative operation can be realized by stacking standard two level three phase active rectifiers as shown in FIG. 13.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. The scope of the invention is defined by the claims and their equivalents.

What is claimed is:

1. A high voltage inverter comprising:
a plurality of k-level flying capacitor H bridge modules, k being an integer greater than two, each of the plurality of k-level flying capacitor H bridge modules having: a positive dc terminal, a negative dc terminal, two ac terminals, and a dc source connected to an ac source and having a transformer, a rectifier rectifying an output voltage of said transformer, and a capacitor connected between the positive and negative dc terminals; and
a connecting unit for connecting said ac terminals of said plurality of k level flying capacitor H bridge modules in series to form a cascading set of modules;
wherein carrier waveforms for switching the plurality of k-level flying capacitor H bridge modules are phase shifted from one module to a next module by an angle equal to approximately 90 degrees divided by a number of modules in the plurality of k-level flying capacitor H bridge modules.

2. A high voltage inverter according to claim 1, wherein when k is equal to three, each of the plurality of k-level flying capacitor modules is a three-level flying capacitor module and includes:
first and second poles, each containing four switching devices and a flying capacitor,
a first pair of said four switching devices is connected between said positive dc terminal and the first of said ac terminals,
a second pair of said four switching devices is connected between the first of said ac terminals and said negative dc terminal, and
a first connection of said flying capacitor is between said first pair of switching devices, and a second connection is between said second pair of switching devices.

3. A high voltage inverter according to claim 1, wherein when k is equal to four, each of the plurality of k-level flying capacitor modules is a four-level flying capacitor module and includes:
- first and second poles, each containing six switching devices each and two flying capacitors,
- a first set of three of said six switching devices is connected between said positive dc terminal and the first of said ac terminals,
- a second set of three of said six switching devices is connected between the first of said ac terminals and said negative dc terminal,
- a first connection of the first of said two flying capacitors is between the first and second switching devices in said first set of three switching devices, and a second connection of the first of said two flying capacitors is between the second and third switching devices in said second set of three switches, and a first connection of the second of said two flying capacitors is between the second and third switching devices in said first set of three switching devices, and a second connection of the second of said two flying capacitors is between the first and second switching devices of said second set of three switching devices.

4. A high voltage inverter according to claim 1, wherein said rectifier is a three-phase passive rectifier having three ac input connections and two dc output connections and a zig-zag implementation of said transformer.

5. A high voltage inverter according to claim 1, wherein said rectifier includes a plurality of three phase two level active rectifiers, each having three ac input connections and two dc output connections and a mechanism to stack said three phase two level active rectifiers using a series connection of said dc terminals.

6. A high voltage inverter according to claim 2, wherein a carrier waveform for switching the first switch of the first pair of said four switching devices and the second switch of the second pair of said four switching devices, and a carrier waveform for switching the second switch of the first pair of said four switching devices and the first switch of the second pair of said four switching devices are phase shifted relative to one another by about 180 degrees.

7. A high voltage inverter according to claim 3, wherein a carrier waveform for switching the first switch of the first set of three of said six switching devices and the third switch of the second set of three of said six switching devices, a carrier waveform for switching the second switch of the first set of three of said six switching devices and the second switch of the second set of three of said six switching devices, and a carrier waveform for switching the third switch of the first set of three of said six switching devices and the first switch of the second set of three of said six switching devices are phase shifted relative to one another by about 240 degrees.

8. A high voltage inverter according to claim 5, wherein each of the plurality of k-level three phase flying capacitor modules comprises a three-level flying capacitor module and includes:
- first, second and third poles, each containing four switching devices and a flying capacitor,
- a first pair of said four switching devices is connected between said positive dc terminal and the first of said ac terminals,
- a second pair of said four switching devices is connected between the first of said ac terminals and said negative dc terminal, and
- a first connection of said flying capacitor is between said first pair of switches, and a second connection is between said second pair of switches.

9. A high voltage inverter according to claim 5, wherein each of the plurality of k-level three phase flying capacitor modules comprises a four-level flying capacitor module and includes:
- first, second and third poles, each containing six switching devices each and two flying capacitors,
- a first set of three of said six switching devices is connected between said positive dc terminal and the first of said ac terminals,
- a second set of three of said six switching devices is connected between the first of said ac terminals and said negative dc terminal,
- a first connection of the first of said two flying capacitors is between the first and second switching devices in said first set of three switching devices, and a second connection of the first of said two flying capacitors is between the second and third switching devices in said second set of three switches, and a first connection of the second of said two flying capacitors is between the second and third switching devices in said first set of three switching devices, and a second connection of the second of said two flying capacitors is between the first and second switching devices of said second set of three switching devices.

10. A high voltage inverter according to claim 8, wherein a carrier waveform for switching the first switch of the first pair of said four switching devices and the second switch of the second pair of said four switching devices, and a carrier waveform for switching the second switch of the first pair of said four switching devices and the first switch of the second pair of said four switching devices are phase shifted relative to one another by about 180 degrees.

11. A high voltage inverter according to claim 9, wherein a carrier waveform for switching the first switch of the first set of three of said six switching devices and the third switch of the second set of three of said six switching devices, a carrier waveform for switching the second switch of the first set of three of said six switching devices and the second switch of the second set of three of said six switching devices, and a carrier waveform for switching the third switch of the first set of three of said six switching devices and the first switch of the second set of three of said six switching devices are phase shifted relative to one another by about 240 degrees.

* * * * *